Dec. 3, 1957  C. R. MENTZER ET AL  2,814,917
LOCATOR
Filed Jan. 13, 1956  3 Sheets-Sheet 2
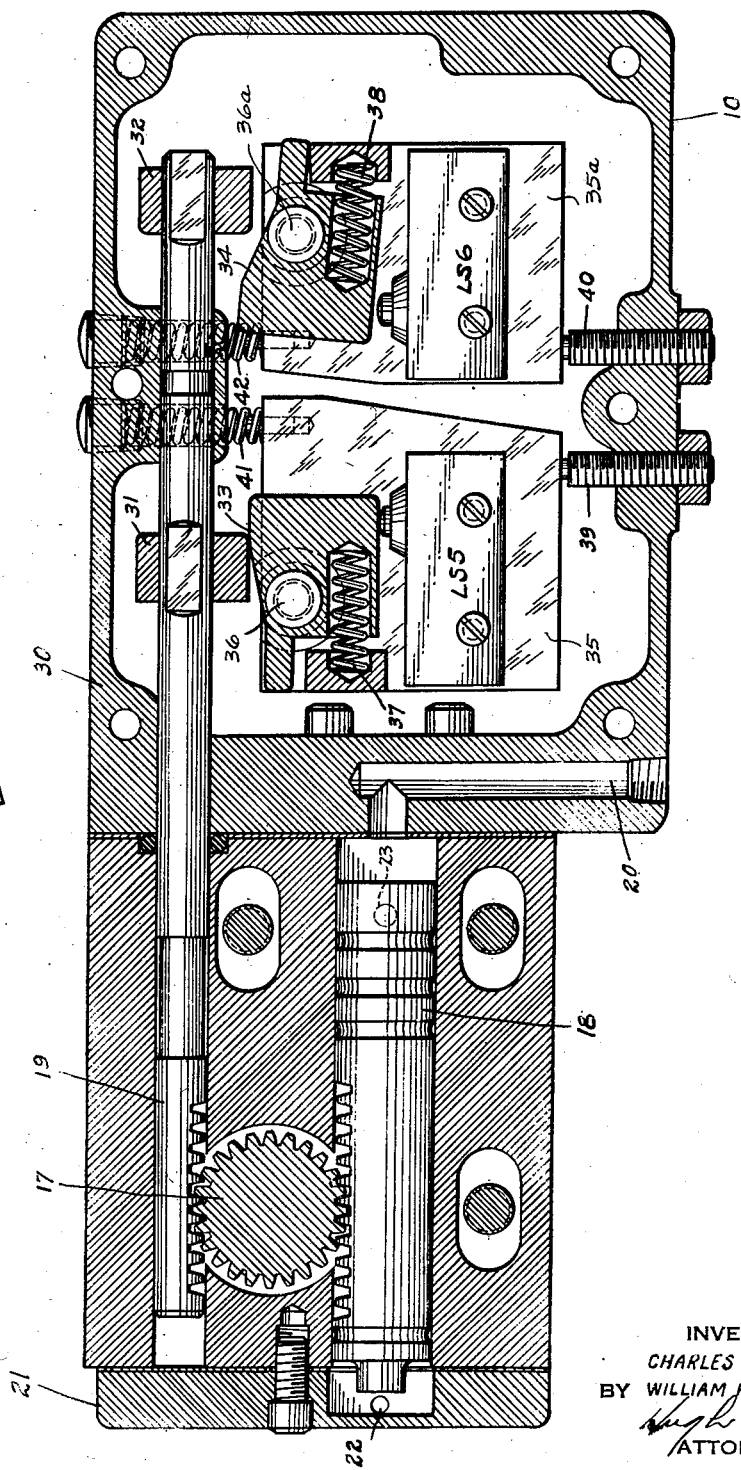
INVENTOR
CHARLES R. MENTZER.
BY WILLIAM P. FLOHR JR.
ATTORNEY

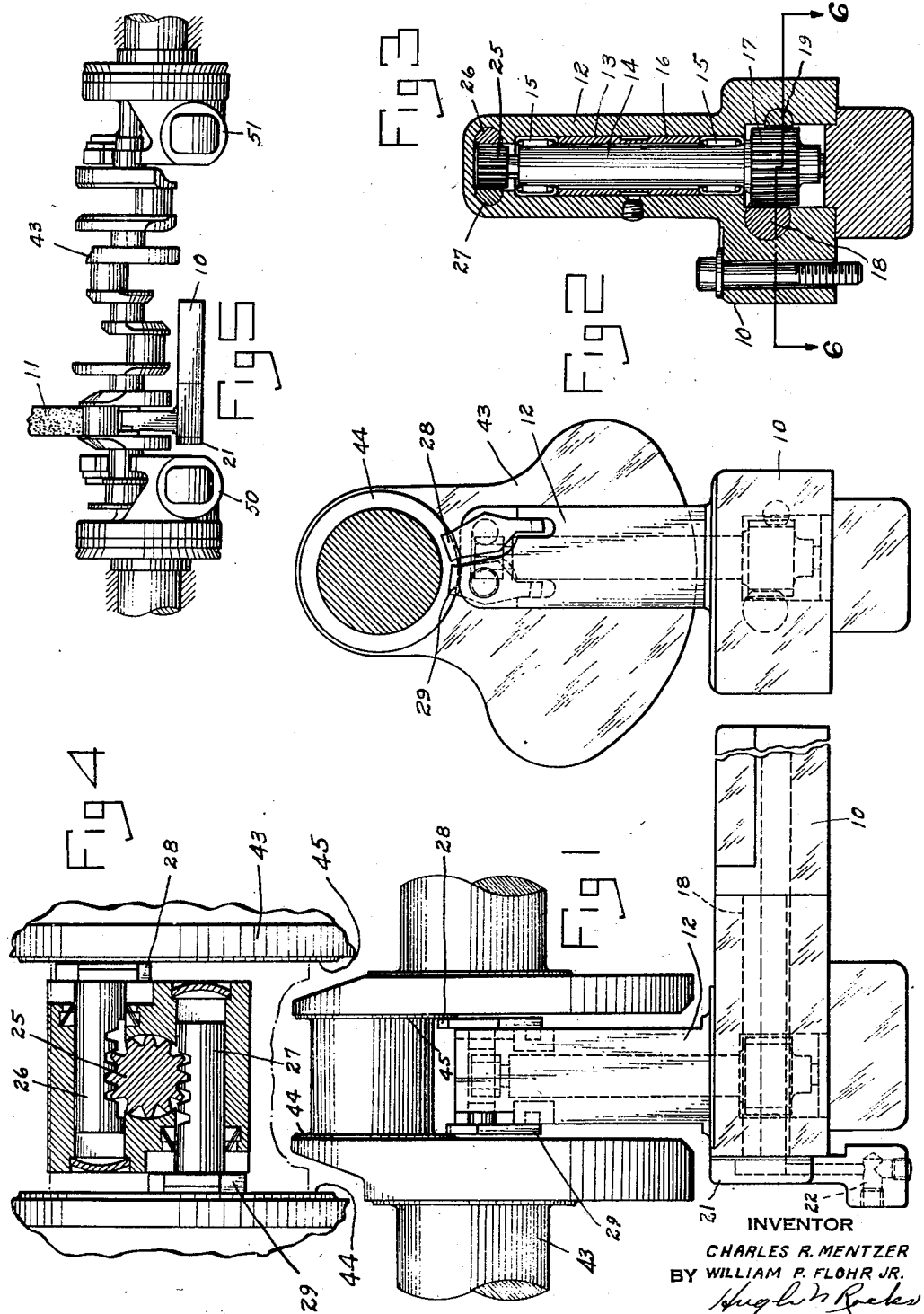

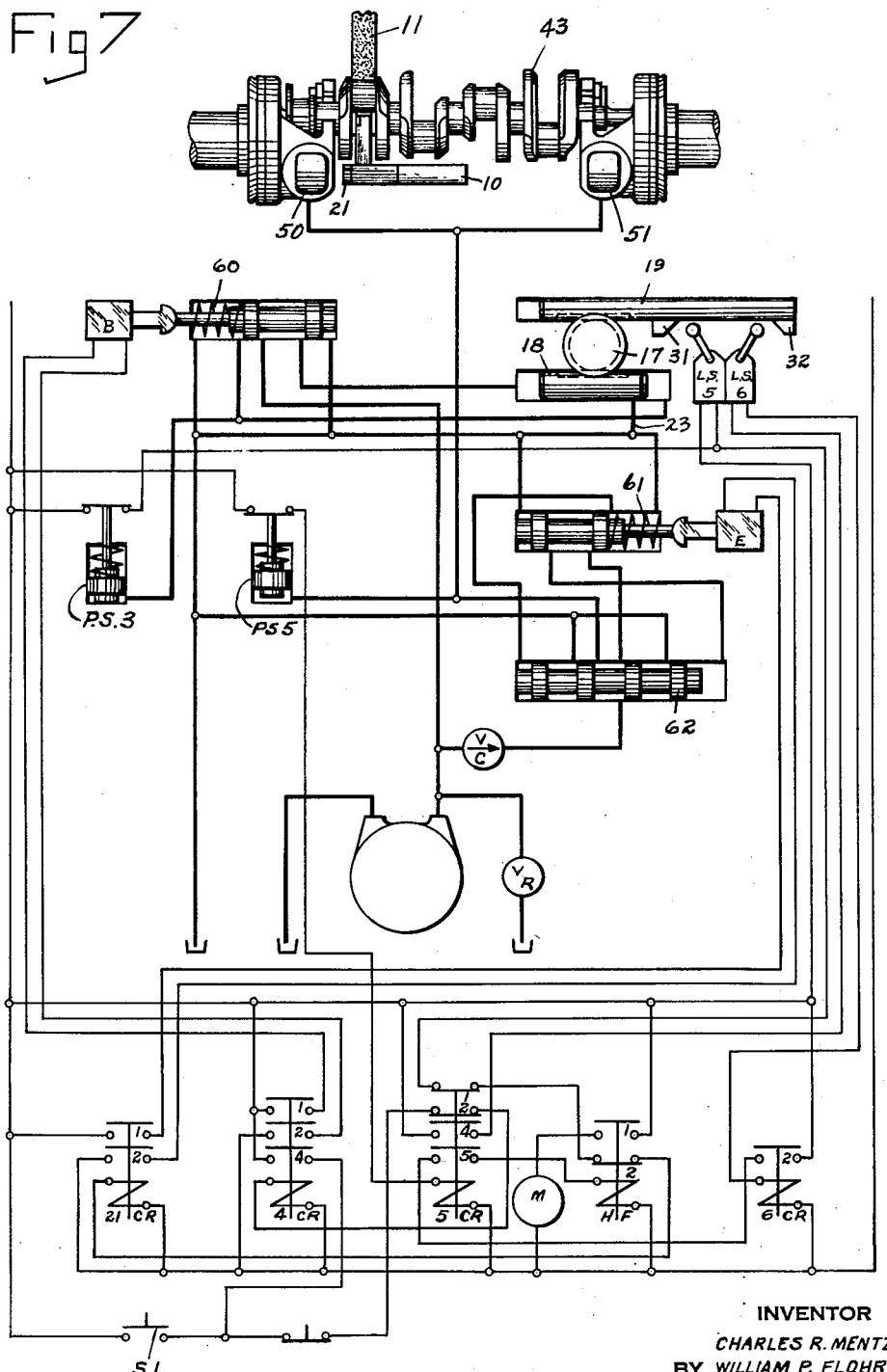

United States Patent Office 2,814,917
Patented Dec. 3, 1957

2,814,917

LOCATOR

Charles R. Mentzer, Rouzerville, and William P. Flohr, Jr., Waynesboro, Pa., assignors to Landis Tool Company, Waynesboro, Pa.

Application January 13, 1956, Serial No. 558,890

6 Claims. (Cl. 51—105)

This invention relates to apparatus for effecting alignment between a cutting tool, particularly a grinding wheel and opposed shoulders or flanges of a workpiece.

An object of this invention is to provide means for shifting a workpiece relative to the supporting means to position said workpiece in alignment with a grinding wheel or other tool.

Another object is to provide a pair of parallel sliding members and means for actuating the same in opposite directions to engage and shift a workpiece.

Figure 1 is a front elevation of a locating device in operative relation with a crank pin.

Figure 2 is an end elevation.

Figure 3 is an end elevation in section.

Figure 4 is a plan view partly in section.

Figure 5 is a partial front elevation showing the relation between the locating device, grinding wheel and clamping fixtures.

Figure 6 is a sectional plan view on the lines 6—6 in Figure 1.

Figure 7 is a hydraulic and electric circuit.

Numeral 10 indicates a base member for a locating device which may be mounted on a carriage of a grinding machine and in exact alignment with the grinding wheel 11. An upwardly extending portion 12 of said base has a bore 13 in which is mounted a shaft 14 rotatably supported in bearings 15 held in axially spaced relation by a sleeve 16. At the lower end of said shaft is a pinion 17 in operative relation with a first rack member 18 in the form of a piston and a second rack member 19 in the form of a control actuating rod. Piston 18 is contained in a cylinder 20.

An intermediate exhaust port 23 in said cylinder permits escape of fluid if for any reason, such as tooth breakage either in rack or pinion, piston 18 should exceed its normal stroke. This escape of fluid prevents operation of PS3 to close the clamps and start the work drive motor when the locator feelers are advanced.

Rack 19 extends into an adjacent portion 30 of the base member 10 and has axially spaced cam members 31 and 32 mounted thereon to engage and actuate pivotally mounted switch operating means 33 and 34 mounted on plates 35 and 35a for actuating switches LS5 and LS6, respectively, also mounted on said plates. Said actuating members 33 and 34 are held out of engagement with said switches by springs 37 and 38. Said switches and actuating members on said plates are in turn pivotally mounted for adjustment relative to cam members 31 and 32. Said adjustment is effected by screws 39 and 40 in opposition to springs 41 and 42. Common pivot means 36 and 36a provide the pivot mounting for said cam and said plates.

A fluid passage 20 in member portion 30 serves to conduct fluid under pressure to the right end of piston 18. A cap member 21 at the left end of base member 10 has a fluid passage 22 for conducting fluid under pressure to the left end of piston 18.

At the top of shaft 14 is a pinion 25 in operative engagement with rack teeth on parallel sliding members 26 and 27 having work engaging surfaces 28 and 29 respectively.

Operation

To actuate the locating device, a signal is produced by a switch in response to the withdrawal of a loading mechanism. For illustrative purposes, such a switch is shown here as a push button S1. S1 completes a circuit through NC–5CR2 to energize 4CR. 4CR1 and 4CR2 actuate a valve solenoid B which directs fluid under pressure to the right end of piston 18 to rotate pinion 17 and shaft 14 in a clockwise direction. Pinion 25 at the upper end of said shaft pushes the sliding member 26 to the right and locating member 27 to the left to engage shoulders 44 and 45 of workpiece 43. If the workpiece is out of line with grinding wheel 11, one of the work engaging members 28 or 29 will engage one of the respective shoulders before the other and will shift the workpiece 43 until the other shoulder and the corresponding work engaging member 28 are in contact, at which time, the shoulders 44 and 45 will be in exact alignment with the sides of grinding wheel 11.

The pressure built up at the right end of the locator piston 18, as a result of the completion of the locating function, opens PS3 while cam 31 opens LS5 to deenergize 21CR and clamp valve solenoid E, allowing spring 61 to shift said clamp valve to the left, directing fluid under pressure to the right end of valve 62 which, in turn, directs fluid to the clamping fixtures 50 and 51 to actuate same and to close PS5.

PS5 completes a circuit to energize 5CR. Normally closed 5CR–2 opens to deenergize 4CR. 4CR–1 and 4CR–2 deenergize locator valve solenoid B and spring 60 resets said valve to the right to direct fluid under pressure to the left end of locator piston 18 to retract said locator. Retraction of said locator closes LS5 and LS6 and also cuts off the pressure to normally closed PS3. LS5 and PS3 have no immediate function. LS6 completes a circuit from 5CR–4 to energize 6CR. 6CR–2 completes a circuit through 5CR–5 to HF to close HF1 and energize work drive motor M.

Thus, clamps 50 and 51 must be closed so that PS5 can energize 5CR to close one link in circuit to start motor M. The locator must be retracted through opening of 5CR–2 in response to closing of said clamps so that LS6 will close 6CR and close the other link 6CR–2 in the circuit to HF and motor M.

The locating cycle may be summarized as follows:

(1) Loader withdrawal signals locator advance.

(2) Locator advance opens 3PS which closes clamps.

(3) Clamp pressure closes 5PS which partially completes a circuit to motor M and retracts locator.

(4) Retracted locator closes LS6 and completes circuit to motor M.

We claim:

1. In a machine tool, a chuck for holding a workpiece, means for effecting axial location relative to said chuck of workpieces having opposed shoulder portions including a pair of work engaging members, one for each of said shoulders, means to shift said work engaging members simultaneously in opposite directions so that one member will shift the workpiece until the opposite shoulder engages the other member, hydraulic means for shifting said members and means responsive to increase in pressure when both of said members engage said shoulders for effecting actuation of said chuck to grip said workpiece.

2. In a machine tool for machining a workpiece having opposed axially spaced shoulder portions, means for rotating said workpiece including a motor, a cutting tool for performing the machining operation, clamping means for holding said workpiece and means for actuating said clamping means, a locating device in alignment with said cutting tool and having means for engaging said shoulder portions, means for advancing said shoulder engaging means to move said workpiece into alignment with said cutting tool, means responsive to operation of said locating means to actuate said clamp to hold the workpiece, means responsive to operation of said clamp actuating means to close part of a circuit to start rotation of said work drive motor and to retract said locator and means actuated by said locator retracting means to complete a circuit to start said motor.

3. In a machine tool for machining a workpiece having opposed axially spaced shoulder portions, means for rotating said workpiece including a motor, a cutting tool for performing the machining operation, clamping means for holding said workpiece and means for actuating said clamping means, a locating device in alignment with said cutting tool and having means for engaging said shoulder portions, means for advancing said shoulder engaging means to move said workpiece into alignment with said cutting tool, a switch responsive to operation of said locating means to actuate said clamp to hold the workpiece, a switch responsive to operation of said clamp actuating means to close part of a circuit to start rotation of said work drive motor and to retract said locator and a switch actuated by said locator retracting means to complete a circuit to start said motor.

4. In a machine tool for machining a workpiece having opposed axially spaced shoulder portions, means for rotating said workpiece including a motor, a cutting tool for performing the machining operation, clamping means for holding said workpiece and means for actuating said clamping means, a locating device in alignment with said cutting tool and having means for engaging said shoulder portions, means for advancing said shoulder engaging means to move said workpiece into alignment with said cutting tool, a pressure switch responsive to operation of said locating means to actuate said clamp to hold the workpiece, a pressure switch responsive to operation of said clamp actuating means to close part of a circuit to start rotation of said work drive motor and to retract said locator and means actuated by said locator retracting means to complete a circuit to start said motor.

5. In a machine tool for machining a workpiece having opposed axially spaced shoulder portions, means for rotating said workpiece including a motor, a cutting tool for performing the machining operation, clamping means for holding said workpiece and means for actuating said clamping means, a locating device in alignment with said cutting tool and having means for engaging said shoulder portions, means for advancing said shoulder engaging means to move said workpiece into alignment with said cutting tool, a pressure switch responsive to operation of said locating means to actuate said clamp to hold the workpiece, a pressure switch responsive to operation of said clamp actuating means to close part of a circuit to start rotation of said work drive motor and to retract said locator, means actuated by said locator retracting means to complete a circuit to start said motor, and means for preventing operation of said locator actuated pressure switch in the event that the means for advancing said shoulder engaging means travels in excess in its prescribed movement.

6. In a machine tool for machining workpieces having spaced shoulder portions, a tool support and a work support, a tool on said tool support for engaging said shoulder portions, locating means on said work support for effecting relative axial movement of said workpiece and said tool including a pair of parallel sliding members mounted in fixed alignment with said tool and each having a work engaging portion thereon for engaging one of said spaced shoulders, power means to shift said sliding members simultaneously in opposite directions, the first member to engage a shoulder serving to shift said workpiece until the other shoulder engages the other sliding member whereby said shoulders and said tool are aligned with one another.

References Cited in the file of this patent

UNITED STATES PATENTS

| 1,846,371 | Sunnen | Feb. 23, 1932 |
| 2,693,062 | Silven | Nov. 2, 1954 |
| 2,723,503 | Mader | Nov. 15, 1955 |